(12) United States Patent
Mohammadi (10) Patent No.: US 10,337,290 B2
(45) Date of Patent: Jul. 2, 2019

(54) HYDROCARBON HEATING SYSTEM

(71) Applicant: Tullow Group Services Limited, London (GB)

(72) Inventor: Shahrokh Mohammadi, London (GB)

(73) Assignee: Tullow Group Services Limited, London (GB)

(*) Notice: Subject to any disclaimer, the term of this patent is extended or adjusted under 35 U.S.C. 154(b) by 186 days.

(21) Appl. No.: 15/326,768

(22) PCT Filed: Jul. 17, 2015

(86) PCT No.: PCT/GB2015/052076
§ 371 (c)(1),
(2) Date: Jan. 17, 2017

(87) PCT Pub. No.: WO2016/009220
PCT Pub. Date: Jan. 21, 2016

(65) Prior Publication Data
US 2017/0204701 A1    Jul. 20, 2017

(30) Foreign Application Priority Data
Jul. 18, 2014    (GB) .................................... 1412767.4

(51) Int. Cl.
*E21B 36/00*    (2006.01)
*E21B 36/04*    (2006.01)
(Continued)

(52) U.S. Cl.
CPC ............ *E21B 36/04* (2013.01); *E21B 17/003* (2013.01); *E21B 17/01* (2013.01); *E21B 36/005* (2013.01);
(Continued)

(58) Field of Classification Search
CPC . H05B 2214/03; E21B 43/24; E21B 43/2401; E21B 36/04; F16L 53/34; F16L 53/35; F16L 53/37; F16L 53/38
(Continued)

(56) References Cited

U.S. PATENT DOCUMENTS

| | | |
|---|---|---|
| 1,934,955 A | 11/1933 | Thrupp |
| 3,591,770 A | 7/1971 | Ando |

(Continued)

FOREIGN PATENT DOCUMENTS

| | | |
|---|---|---|
| GB | 1179031 | 1/1970 |
| GB | 2084284 | 4/1982 |

(Continued)

OTHER PUBLICATIONS

Merriam-Webster "open circuit" : https://www.merriamwebster.com/dictionary/open%20circuit accessed 2018 (Year: 2018).*

(Continued)

*Primary Examiner* — Brad Harcourt
*Assistant Examiner* — David Carroll
(74) *Attorney, Agent, or Firm* — Hogan Lovells US LLP (57) ABSTRACT

A hydrocarbon heating system for a hydrocarbon production and/or transportation system comprising at least one electrical conductor and an alternating current (AC) power source connected to the at least one electrical conductor. The alternating current power source generates heat in the at least one electrical conductor by providing alternating current power to the at least one electrical conductor.

19 Claims, 10 Drawing Sheets

(51) Int. Cl.
*H05B 6/10* (2006.01)
*E21B 17/00* (2006.01)
*E21B 17/01* (2006.01)
*F16L 53/34* (2018.01)
*F16L 53/35* (2018.01)
*E21B 47/06* (2012.01)

(52) U.S. Cl.
CPC .............. *F16L 53/34* (2018.01); *F16L 53/35* (2018.01); *H05B 6/108* (2013.01); *E21B 47/065* (2013.01); *H05B 2214/03* (2013.01)

(58) Field of Classification Search
USPC .................................... 166/248, 60, 57, 302
See application file for complete search history.

(56) References Cited

U.S. PATENT DOCUMENTS

| | | | | |
|---|---|---|---|---|
| 4,539,562 A * | 9/1985 | Sanders | ................ | H02H 7/226 327/97 |
| 4,574,188 A * | 3/1986 | Midgley | ................ | H05B 3/146 219/505 |
| 5,101,899 A | 4/1992 | Hoskins et al. | | |
| 5,782,301 A * | 7/1998 | Neuroth | ................... | H05B 3/56 166/302 |
| 6,009,940 A * | 1/2000 | Eck | ......................... | E21B 36/04 166/302 |
| 6,509,557 B1 * | 1/2003 | Bass | ...................... | H05B 6/108 219/772 |
| 2003/0190162 A1 * | 10/2003 | Hersh | ..................... | F16L 53/38 392/468 |
| 2004/0140095 A1 * | 7/2004 | Vinegar | ................ | E21B 36/008 166/302 |
| 2007/0187089 A1 | 8/2007 | Bridges | | |
| 2012/0073798 A1 | 3/2012 | Parsche et al. | | |
| 2013/0086803 A1 | 4/2013 | Noel | | |
| 2013/0153230 A1 * | 6/2013 | Scott | ....................... | E21B 37/00 166/304 |

FOREIGN PATENT DOCUMENTS

| | | |
|---|---|---|
| GB | 2326226 | 12/1998 |
| WO | 9736063 | 10/1997 |
| WO | 2007084763 | 7/2007 |
| WO | 2008131168 | 10/2008 |

OTHER PUBLICATIONS

Search Report issued in UK Application No. GB1412767.4 dated Nov. 17, 2014.
Examination Report issued in UK Application No. GB1617650.5 dated Dec. 23, 2016.
Examination report dated Dec. 20, 2017 on corresponding European application No. 15741284.2.
International Search Report and Written Opinion issued for corresponding International Application No. PCT/GB2015/052076 dated Feb. 2, 2016.
Horowitz, Paul et al., The Art of Electronics, Cambridge University Press, Chapter 13, pp. 880 and 881.
Wikipedia—Transmission line, https://en.wikipedia.org/wiki/Transmission_line.
Wikipedia—Characteristic impedance, https://en.wikipedia.org/wiki/Characteristic_impedance.

* cited by examiner

FIG. 8 frequency: 61 kHz
voltage: 652 V
$P_{IR}$: 8.9 kW
$P_{ACT}$: 23 kW

HYDROCARBON HEATING SYSTEM

CROSS REFERENCE TO RELATED APPLICATIONS

This application is a 35 U.S.C. 371 National Stage of International Application No. PCT/GB2015/052076, titled "A HYDROCARBON HEATING SYSTEM" filed on Jul. 17, 2015, which claims priority to Great Britain Application No. 1412767.4, titled "A HYDROCARBON HEATING SYSTEM", filed on Jul. 18, 2014, all of which are incorporated by reference herein in their entirety.

FIELD OF THE INVENTION

The present invention generally relates to a hydrocarbon heating system and more specifically a hydrocarbon production and/or transportation heating system and, particularly, but not exclusively, a hydrocarbon production and/or transportation heating system for raising the temperature of hydrocarbons, such as oil and gas, above undesirable temperatures, such as the waxing temperature.

BACKGROUND TO THE INVENTION

Hydrocarbon production from a reservoir or transportation can be affected by the flow rate at which the hydrocarbons can be extracted or moved. Some oil reservoirs contain high viscosity oil and/or hydrocarbons which form wax under certain conditions. Wax deposits are, primarily, from long chain (more than 18 carbon atoms) paraffin hydrocarbons and appear when the temperature of the fluid is below the "cloud" point or waxing temperature. Similarly, gas and gas/condensate production can suffer from hydrate formation at high pressures and low temperatures.

That is, hydrocarbon flow from a production system, such as a well, or through a transportation system, such as a pipeline, can be affected by, amongst other things, both the viscosity of the oil and the build up of wax deposits. It is known to heat the fluids being extracted through the well to increase the flow rate of the fluids. In many cases, the fluids are hot in the reservoir but it is also known to heat the production tubing in the well casing. In many wells, the temperature of the fluids drops, as they approach the wellhead. A natural geothermal heat profile typically gradually reduces in temperature from the bottom of the well towards the wellhead. That is, the temperature of the fluid in the reservoir at the point of extraction (at the perforations) is greater than at the wellhead. In some cases, the decrease in temperature along the length of the well borehole causes the fluids being extracted to be colder than the cloud point and, therefore, wax crystals begin to occur. In addition, the viscosity of the oil in the fluids will also increase. Heating the production pipes helps to maintain the flow rate by minimising wax crystallisation and maintaining a lower viscosity as the reservoir fluids are extracted. Heating of production tubing may also be required after a shut-in period where the static hydrocarbons maybe inclined to form wax depending on their nature. The energy required to re-start the well may be considerable and take a long time, if feasible.

Prior art solutions for heating the fluids being extracted in a well borehole typically rely on resistive heating of heating elements.

The inventor of the present invention has noted that an improved method and system for heating a well can be provided.

SUMMARY OF THE INVENTION

An object of the present invention is to mitigate problems with the prior art, and, preferably, to improve hydrocarbon production and/or transportation.

According to a first aspect of the present invention there is provided a heating system for a hydrocarbon production and/or transportation system comprising:
   at least one heating conductor; and
   an alternating current (AC) power source connected to the at least one heating conductor,
wherein, the alternating current power source generates heat in the at least one heating conductor by providing alternating current power to the at least one heating conductor.

According to a second aspect of the present invention there is provided a heating system for a hydrocarbon production and/or transportation system comprising:
   at least one electrical conductor; and
   an alternating current (AC) power source connected to the at least one electrical conductor,
   wherein, the alternating current power source generates heat in the at least one electrical conductor by providing alternating current power to the at least one electrical conductor.

The at least one electrical conductor may be referred to as a heating conductor.

Preferably, the at least one electrical conductor is terminated, at the end of the conductor either by an open circuit, short circuit, inductive connection, capacitive connection or resistive connection. The most preferable arrangement is an open circuit.

Optionally, at least two electrical conductors are present, separated by an insulator.

Preferably, the desired profile of heating along the length of the at least one conductor is controlled by variation of: magnitude of AC voltage of the AC power source; frequency of the AC voltage of the AC power source; or a combination of AC voltage and frequency.

Further preferably, multiple AC frequency excitations are used, having different combinations of AC voltage and frequency.

More preferably, parameters of the hydrocarbon production and/or transportation system are collected and the AC voltage and frequency selected based on those parameters according to a pre-defined algorithm. The parameters preferably include: thermal parameters (conductivity, specific heat capacity, etc.) of the solids and fluids in the production system (production tubing, production casing, filler material between tubing and casing, brine, etc.); the waxing temperature(s) of the relevant hydrocarbons; the length of the production system; the temperature profile of the production system; and the temperature of the relevant hydrocarbons.

The at least one electrical conductor can be deployed in the production system in the form of a "heat trace cable". That is, an electrical cable containing the conductors and separated by a form of insulation, such as a form of plastic. Preferably, the heat trace cable is positioned, or further preferably attached, to production tubing (tubing carrying the extracted hydrocarbons), such that heat emanating from the heat trace cable is most efficiently distributed to the extracted hydrocarbons, such as crude oil.

Alternatively, the at least two electrical conductors use existing infrastructure in the production system. Preferably, if present, an existing electrical cable, such as a pump power cable, is used as the heat trace cable.

Further alternatively, the production system includes production tubing co-axially positioned in production casing and separated by a filler material or materials, such as brine, the production tubing and casing being electrically insulated and the at least two electrical conductors are the production tubing and the production casing.

In one embodiment, the insulating material is an insulated coating on one or both of the production tubing or casing. Alternatively, the insulating material is an insulating gas, such as Nitrogen.

The optional features of the second aspect of the present invention can be incorporated into the first aspect of the present invention and vice versa.

According to a third aspect of the present invention, there is provided a method of heating a hydrocarbon production system including:
   providing at least one electrical conductor; and
   providing an alternating current (AC) power source connected to the at least one electrical conductor,
   wherein, the alternating current power source generates heat in the at least one electrical conductor by providing alternating current power to the at least two electrical conductors.

The optional features of the second aspect of the present invention can be incorporated into the third aspect of the present invention and vice versa.

BRIEF DESCRIPTION OF THE DRAWINGS

An embodiment of the present invention will now be described, by way of example only, and with reference to the accompanying figures in which:

FIGS. 13(a) and (b) are cross-sectional diagrams of a well borehole according to one embodiment of the present invention;

FIGS. 14(a) and (b) are electric circuit models of an insulated well borehole according to one embodiment of the present invention;

DETAILED DESCRIPTION

Resistive heating of well boreholes, as is known in the prior art, usually consists of providing a resistive heating element in contact with the production tubing containing the fluids extracted from the reservoir. Disadvantages of this method include:
   No ability to target different areas which require heating (once a resistive element is installed);
   Uniform heating of the production tubing in contact with a resistive element; and
   A specialist resistive heating element requires to be installed in the well borehole in contact with the production tubing.

The present invention does not use resistive heating but, instead reactance heating, also referred to as transmission line heating, through the use of at least one insulated conductor and the application of an alternating current power source. In this manner, the present invention is able to provide specific heating profiles along hydrocarbon tubing to minimise the power required to ensure the temperature of the fluids being extracted remain above the cloud point, waxing temperature or hydrate formation.

As is known, reactance can be positive imaginary (i.e. inductive) or negative imaginary (i.e. capacitive) and under most circumstances these reactances are frequency dependent. A capacitor exhibits a reactance the magnitude of which decreases with frequency and an inductance has a reactance magnitude which increases with frequency. The sign and magnitude of a reactance can thus be modified by manipulation of the AC frequency and at a particular frequency the current induced can be manipulated by modifying the amplitude of the AC voltage.

Furthermore, whilst the remaining description refers to the application of a hydrocarbon production heating system to wells and well boreholes, it should be understood that the invention may be applied to any hydrocarbon transportation conduit such as a well, riser, flowline or pipeline.

Figure 1:
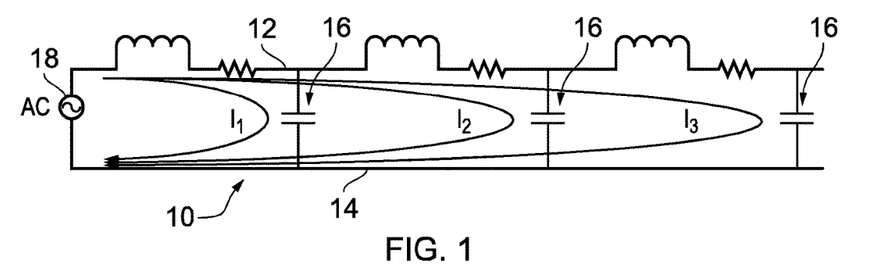
FIG. 1 is a schematic diagram of current flow in a hydrocarbon production heating system according to one embodiment of the present invention.

Referring to FIG. 1, the present invention, according to one embodiment, uses the fact that a cable 10 (shown schematically), or other conductors separated by an insulator, having more than one electrical conductor 12, 14 contain an intrinsic capacitance 16 between the conductors 12, 14 which must be repeatedly charged and discharged when the cable 10 is excited with AC (Alternating Current) voltages 18. This (dis)charging current $I_1$, $I_2$, $I_3$ heats the cable. If the cable is put in thermal contact with suitable hydrocarbon tubing, the hydrocarbons are, consequently, heated. The charging current decreases as a function of distance on the cable 10 at a specific frequency, meaning that the heating effect on the sections of the cable 10 closest to the power supply 18 is greater than the heating effect at the far end of the cable 10. This is shown in FIG. 1: the current $I_1$ at the end of the cable 10 nearest to the AC source 18 is larger than the current $I_3$ at the far end of the cable 10 because more capacitance charging current flows in that end. As a result, the end of cable 10 nearest to the AC source 18 becomes hotter than the end of the cable 10 furthest from the AC source 18.

The temperature and/or heat profile of the cable 10 is typically complex. The temperature and/or heat profile of the cable 10 is normally one or more of user selectable, tuneable and non-linear. More than one frequency of AC power can be supplied to the cable 10, typically the more than one frequency or frequencies are provided successively, that is one after the other. The AC power on the cable is then an average of the more than one frequency or frequencies.

Whilst two conductors are described in the example above, it is also possible to create an AC system using a single wire conductor. In this case, the return path can be provided by "earth", or a body of water for that matter. The same effect as described above can be achieved using a single conductor.

In addition, heating provided by the or each conductor can be more evenly distributed to the hydrocarbon tubing through selection of the arrangement of the or each conductor and the hydrocarbon tubing. For example, the or each conductor can be helically wrapped around the hydrocarbon tubing. Helically wrapped hydrocarbon tubing is preferably used in marine riser systems (from the seabed to a surface facility), although other applications may also be applicable.

The amount of heating provided by a cable and the heating profile shape, that is how much of the cable is heated and the relative difference between the near end and the far end (with respect to the AC source) can be controlled by modifying at least three parameters:
- voltage magnitude of AC source;
- frequency of AC source (which alters the skin effect and cable reactance)
- termination at end of cable—this could be open circuit, short circuit, inductive, capacitive or resistive.

In this manner, two conductors, separated by an insulator, which may be in the form of cable, can be deployed in a well borehole to provide heating by connecting the conductors to an AC power source. The depth of the heating can be controlled using the parameters mentioned above such that the amount of power used to heat the well to the required temperature is minimised. Minimising the amount of power increases profitability of the well by reducing operating expenditure (OPEX).

Optimal (i.e. minimum energy) well heating can be determined using the following steps:
1. Identify the temperature requirement of a particular section of a well heating system to achieve the desired heating of the crude oil inside the tubing (initially assuming no oil flow). This determines a target temperature.
2. Determine the relation between power dissipated and temperature in the section of the well heating system to give the target power dissipation in that section.
3. Compute frequency and voltage of the AC excitation to induce the required dissipated power profile along the conductors of the well heating system.

Figure 2:
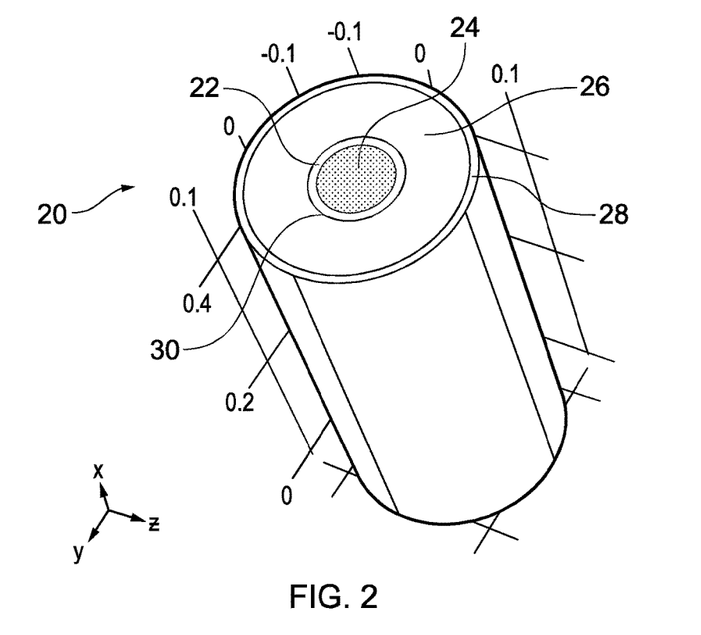
FIG. 2 is a sectional diagram of a well borehole according to one embodiment of the present invention.

For example, FIG. 2 shows a section of a well borehole 20. The borehole 20 includes a steel/chrome production tube 22 containing crude oil 24, surrounded by brine 26 and encased in a concrete production casing 28. Heating is achieved by running a single heat-trace cable 30 (the cable having two conductors separated by an insulator) down the side of the production tube 22 which makes good thermal contact with the brine 26 and hence with the production tubing 22 through the brine 26.

The thermal parameters (including conductivity and specific heat capacity) of each material (steel/chrome tube, concrete casing, brine and crude oil) are known. Therefore, calculations of the thermal system of the borehole 20 can be calculated.

Well Specific Power (WSP)

The thermal system described above is linear and hence it is useful to introduce the notion of Well Specific Power, or WSP. The WSP is the power required to heat a 1 m (meter) section of well by 1° K in steady state (i.e. no oil flowing and with the boundary condition set such that the earth surrounding the production casing is at constant temperature). Due to the linearity of the thermal model, it is possible to write the power requirement, $P_R$, of a 1 m section of well in terms of the WSP as:

$$P_R = P_s \cdot \Delta T$$

where $\Delta T$ is the difference between the steady state temperature without heating applied and the minimum required temperature to heat the system to, for example, the waxing temperature. Simulations and experiments show that the WSP was around 6.25 W for a well with a 3½" production tubing and a 9⅝" production casing.

Ideal Power Profile (IPP)

Figure 3:
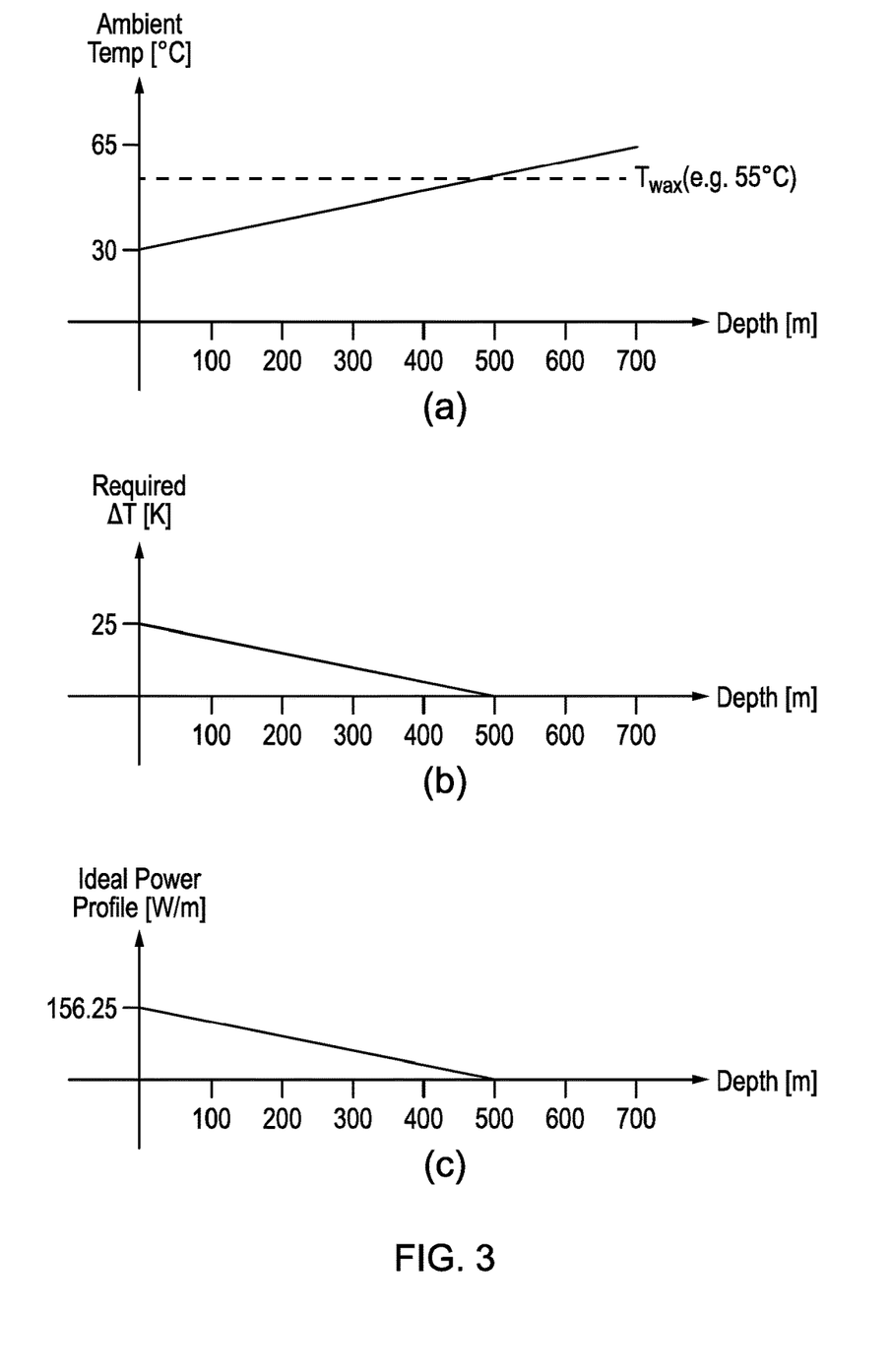
FIGS. 3(a), 3(b) and 3(c) are graphs relating depth of a well to power and temperature according to an example of one embodiment of the present invention.

The ideal power profile is the minimum power dissipation required per meter of well to prevent waxing plotted as a function of position down the well. That is, it is the required power, $P_R$, plotted as a function of distance down the well. FIG. 3 shows an example of a typical Kasamene well with a depth of 700 m and a thermal gradient (FIG. 3(*a*)) of around 5.5° C./100 m, with a waxing temperature of 55° C. FIG. 3(*b*) shows the required temperature increase in the well borehole to prevent waxing, based on the thermal gradient of FIG. 3(*a*). As can be seen, no temperature increase is needed below 500 m.

The ideal power profile is then given by multiplying the graph of FIG. 3(*b*) by the WSP value, to give the plot of FIG. 3(*c*).

Ideal Required Power (IRP)

Once the analysis above has been performed to evaluate the WSP and plot the IPP, the ideal required power, $P_{ID}$, can be found. This is the minimum power required to heat the well to maintain the crude temperature above the waxing temperature and is therefore found by integrating the IPP along the length of the well, giving:

$$P_{ID} = \frac{P_s}{2}\left[\frac{T_{grad}}{100}L^2 + \frac{100}{T_{grad}}(T_{wax} - T_{res})^2 + 2L(T_{wax} - T_{res})\right]$$

where $T_{grad}$ is the wells thermal gradient in K/100 m, L is the well length to the reservoir at a temperature $T_{res}$ and $T_{wax}$ is the waxing temperature. This ideal required power is a useful quantity, as this power level is the minimum required to heat the well in steady state and is independent of the method used to heat the cable.

The total heating power required for a well will then be close to the IRP, but may be more due to losses. Any heating solution which uses uniform heating methods, such as using resistive heating, will require significantly higher power than a method, such as disclosed herein, which uses a profiled approach.

Having found the ideal power profile (IPP), the next step is to determine the best excitation method for the well heating system which achieves, as closely as possible, the IPP. To generate the required tapered heating profiles along the length of the electrical conductors, an open circuit down-well termination is preferred. This has the advantage of automatically causing a zero current at the deepest part of the electrical conductors of the well heating system, meaning that power is not wasted heating oil that is already well above waxing temperature and means that the down-hole part of the system is as simple and robust as possible.

Now that the above system is understood, simulations are performed which determine the achievable heating profiles in varying lengths of electrical conductors of a well heating system using different excitation frequencies for a standard 100V excitation. For each frequency, the power dissipated is recorded at a sampling distance, such as every 100 m along the cable and a look-up table constructed. As the power is proportional to the square of the excitation voltage, simulations do not need to be run or a look up table constructed for varying input voltages, as the effect of voltage change can be directly calculated.

Calculation of Optimal Frequency and Voltage

Figure 4:
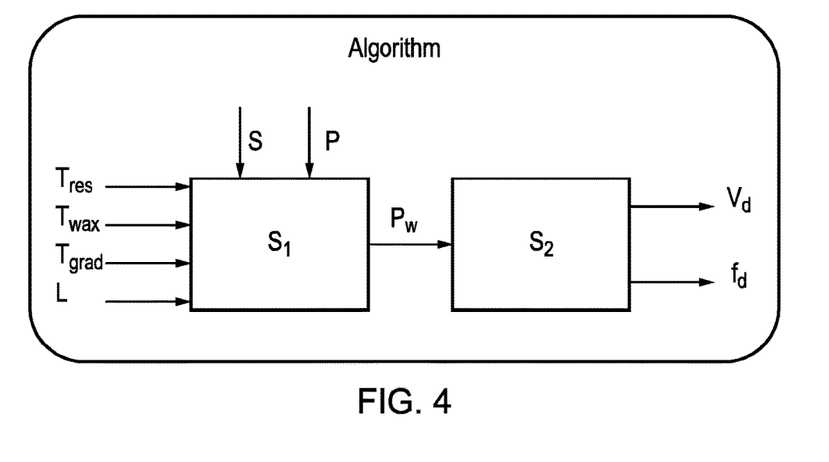
FIG. 4 is a schematic flow diagram of a method of determining the AC voltage and frequency to apply to a hydrocarbon production heating system according to one embodiment of the present invention.

Overall, the method for picking the optimum frequency and voltage is performed in two steps. This is illustrated graphically in FIG. 4. S1, or stage 1, of the method is the system described above. The WSP is calculated and, knowing the temperature profile of the well ($T_{res}$, $T_{grad}$) and the waxing temperature ($T_{wax}$), the length of the well L and the required power, $P_R$, at several sampling points, S, is calculated. These points are then fed into S2, or stage 2, where a least-square algorithm is used to choose the profile in the lookup table that most closely matches the calculated points.

A number of examples of the above method will now be described.

Example 1

Figure 5:
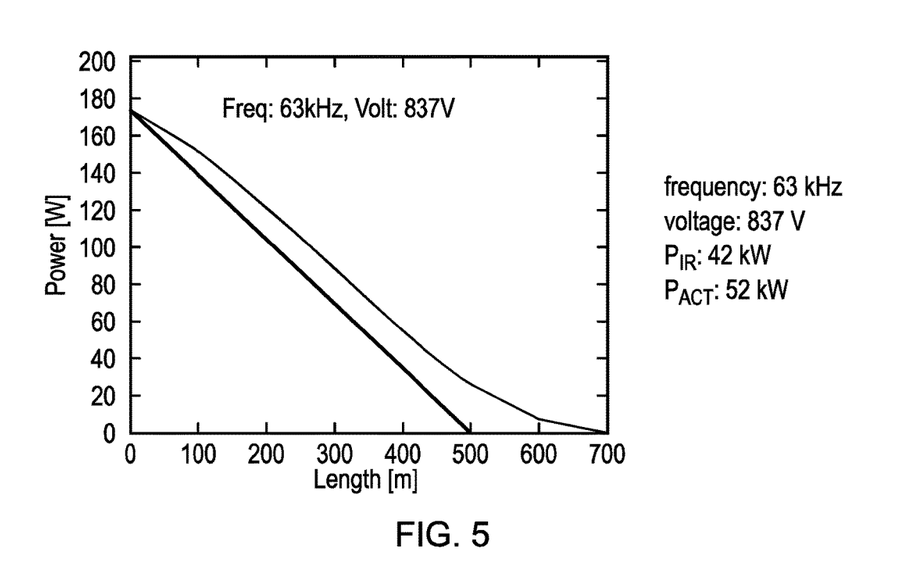
FIG. 5 is a graph of well depth to power required to heat according to one example of the present invention.
Figure 6:
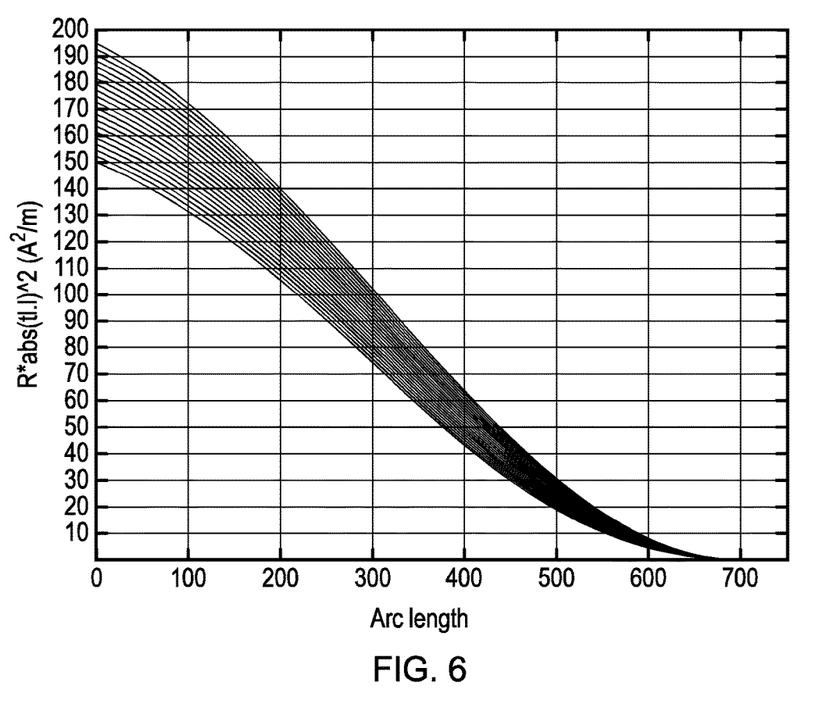
FIG. 6 is a graph representing changes in frequencies against changes in well depth for the example of FIG. 5.

T reservoir: 66° C.
T gradient: 5.5° C./100 m
T waxing: 55° C.
Length: 700 m
Sample Step: 100 m The optimal voltage is found to be just over 800V and the optimum frequency of operation to be around 63 kHz. A comparison between the ideal power profile and the realisable power profile is shown in FIG. 5. As can be seen, the actual realised heating power, $P_{ACT}$, is greater than the ideal required power, $P_{IR}$, by around 20%. As the heating profile achieved depends on knowing the length of the electrical conductors of the well heating system, a robustness analysis has been performed to verify the heating profile against changes in length, as shown in FIG. 6. As can be seen, the profile varies by around 10% for a little over a 1% change in length, meaning that it is advisable for length to be known to within 1% using this method.

Example 2

Figure 7:
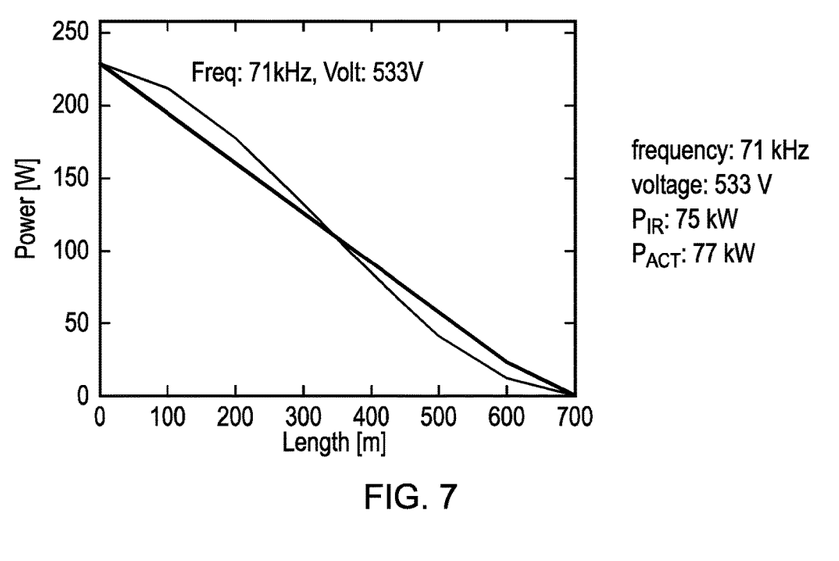
FIG. 7 is a graph of well depth to power required to heat according to one example of the present invention.
Figure 8:
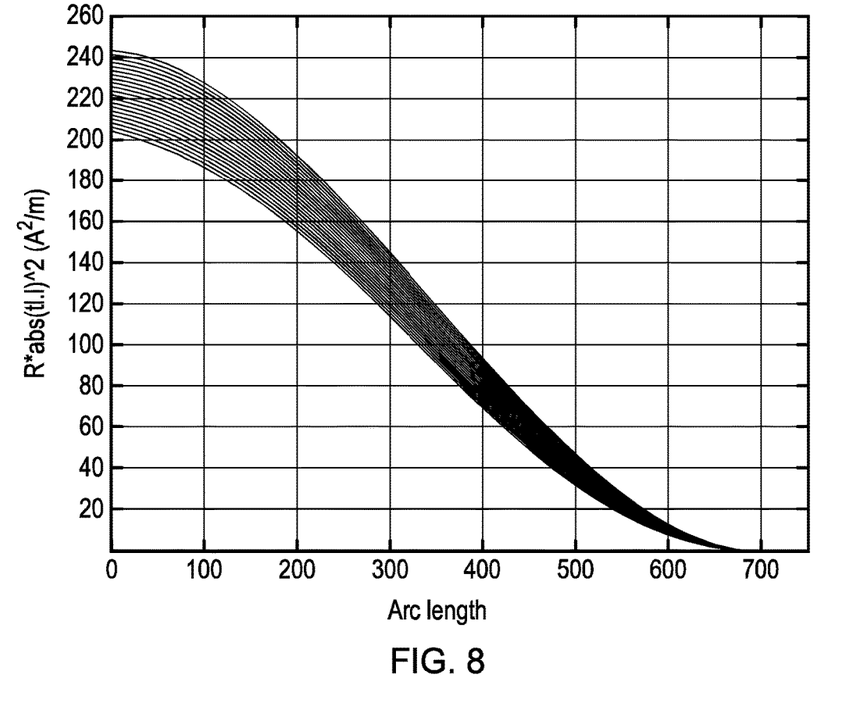
FIG. 8 is a graph representing changes in frequencies against changes in well depth for the example of FIG. 7.

T reservoir: 62° C.
T gradient: 5.5° C./100 m
T waxing: 60° C.
Length: 700 m
Step: 100 m In this example, shown in FIG. 7 and FIG. 8, the achieved heating power is only around 2% higher than the ideal required power.

Example 3

Figure 9:
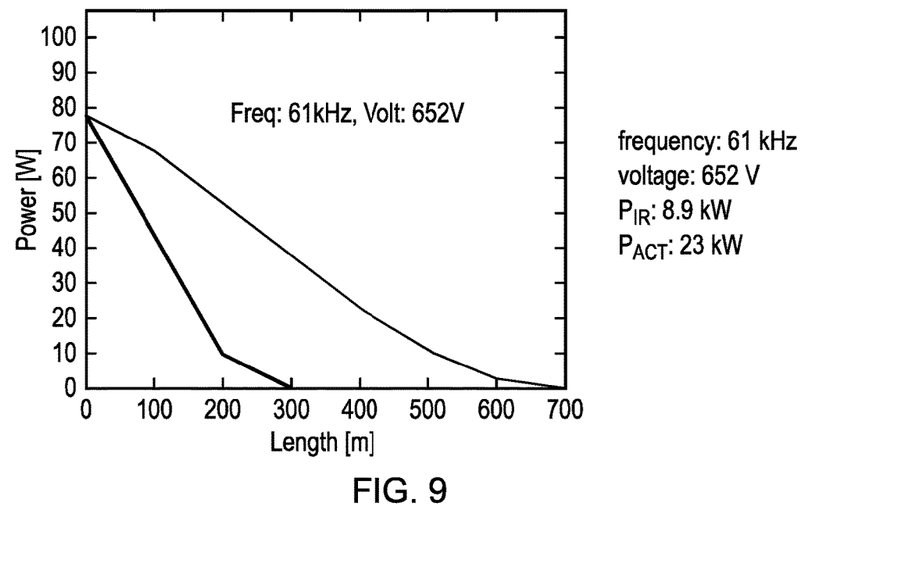
FIG. 9 is a graph of well depth to power required to heat according to one example of the present invention.
Figure 10:
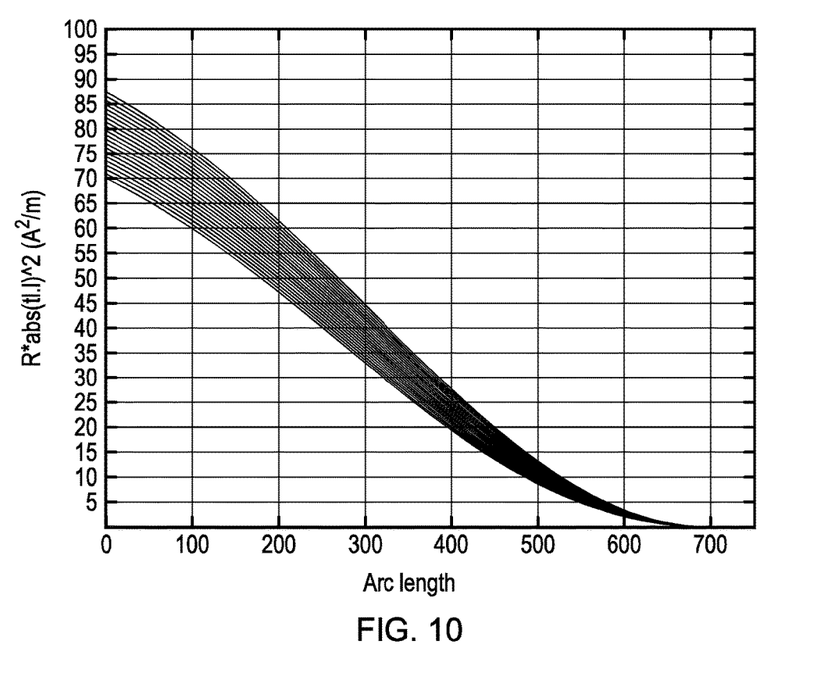
FIG. 10 is a graph representing changes in frequencies against changes in well depth for the example of FIG. 9.

T reservoir: 73° C.
T gradient: 5.5° C./100 m
T waxing: 47° C.
Length: 700 m
Step: 100 m In this example, shown in FIGS. 9 and 10, the well is overheated by over 100% (required power level of 8.9 kW and heated by 23 kW). However, the well heating system only needs to reach 300 m deep, rather than the complete 700 m depth of the well. If this is known a priori, it is possible to insert a cable just to the required depth, rather than the full depth of the well, as was done in the example.

Static Oil Versus Flowing Oil Analysis

The examples above are based on simulations of steady state thermal properties of a well assuming there is no oil flow. This is equivalent to the start-up condition of a well which has been idle for a significant time. When a producing well is in operation, hot oil flowing up the production tubing tends to heat the system and consequently the static analysis gives a worst-case heating condition (less power will actually be required).

There is also an intrinsic feedback in operation in a heated well because of the change in viscosity of the oil with temperature:
  if the oil is sufficiently hot, it flows faster but it is already at the desired temperature;
  if the oil is cooling, it slows down and thus spends more time being heated.

Therefore, it is possible to reduce the power applied to the well heating system to achieve desirable steady state conditions with flowing hydrocarbons.

Multi Frequency Excitation

A further embodiment of the invention that improves the control of the heating profile of the system described above is to use multi-frequency excitation of the electrical conductors.

Calculating the power dissipated in the cable in this case is non-trivial. Normally, to calculate power loss, the current due to each individual excitation would be calculated (with all other frequency sources set to zero) and the resulting currents added. The resulting current could normally be used to calculate the resulting power loss. However, in this case, the resistance value seen by the different currents is different due to the resistance being dominated by the skin effect. The skin effect is the variation seen in resistance of a conductor at higher frequency. That is, at higher frequencies, current tends to travel closer to the outside of a circular cross-section conductor and, therefore, is known as the skin effect, because the current is travelling in the skin of the conductor. This means that (for dual frequency excitation) the power can be written as:

$$P_{TOT} = P_1 + P_2 + \sqrt{P_1 P_2}\left(\sqrt{\frac{R_1}{R_2}} + \sqrt{\frac{R_2}{R_1}}\right)$$

Where $P_1$ and $P_2$ are the individual powers under independent excitation by frequencies 1 and 2, and $R_1$ and $R_2$ are the cable resistances at frequencies 1 and 2.

If we write $R_1 = \alpha R_2$ then we can write the above as:

$$P_{TOT} = P_1 + P_2 + \sqrt{P_1 P_2}\left(\sqrt{\alpha} + \frac{1}{\sqrt{\alpha}}\right)$$

where the term involving α is always greater than 2, but in reality, as the frequencies required to create a good heating profile are close together, so the term will be close to 2.

Figure 11:
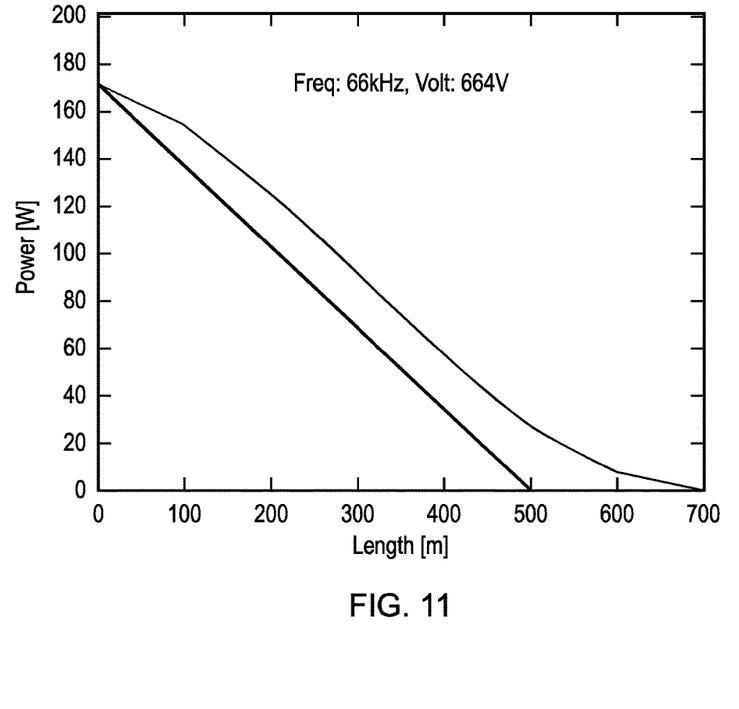
FIG. 11 is a graph of well depth to power required to heat (showing the applied voltage and frequency) according to one example of the present invention.
Figure 12:
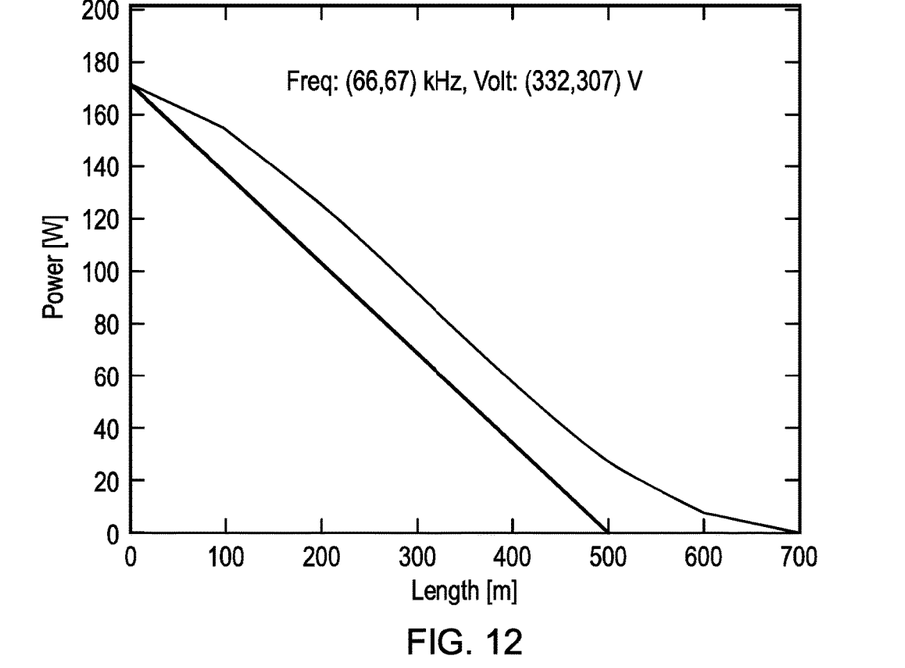
FIG. 12 is a graph of well depth to power required to heat using multiple frequencies, to compare to that of FIG. 11, according to one example of the present invention.

FIG. 11 and FIG. 12 shows the effect of multi-frequency excitation obtained by varying the weight associated to the overall employed voltage in the minimization problem: if the frequency is increased (FIG. 12) in a multi-frequency excitation, with very similar frequencies, the sum of the two voltages is less than that needed by a single frequency excitation and the overall power is reduced.

Heating Using Existing Well Infrastructure

Rather than adding dedicated electrical conductors, such as a heat trace cable, it is possible to use existing well infrastructure for heating purposes. For example, a pump power cable is typically present in a well borehole in contact with the production tubing. It is, therefore, possible to use the pump power cable as long as AC blocking filters can be installed at either end of the cable to isolate the heating excitation from the pump and 3-phase source (i.e. isolate the original use of the cable from the additional heating use). Simulations have been performed using two of the three cores of a pump cable (as the heating effect in this example is described using single phase, making one of the pump cable cores redundant). The equivalent transmission line modelled as a parallel line conductor is characterized by the following values: capacitance $C=2.82\times10-10$ [F/m], inductance $L=8.22\times10-8$ [H/m], conductance $G=1.52\times10-23$ [S/m]. Comparing the above values with those obtained with a coaxial cable used as the two electrical conductors of a well heating system, namely $C=1.56\times10-10$ [F/m], $L=2.01\times10-7$ [H/m], $G=6.23\times10-24$ [S/m], it can be seen that the pump cable and coaxial cable have very similar electrical quantities. Simulations have shown that the electrical behaviour of a pump cable and coaxial cable are very similar. From the thermal point of view, the only factor preventing the use of a pump power cable may be the maximum achievable temperature, given the pump power cable is not designed for this purpose. A dedicated heat trace coaxial cable would be able to operate at higher temperatures.

Cableless Heating

A further embodiment of the present invention is to heat well boreholes without the need for any form of specifically deployed electrical conductors, such as a heat trace cable or pump cable. In this embodiment, as shown in FIG. 13(a), a production tubing 40 and production case 42 can be used to form a large coaxial "cable", with the production tube 40 acting as an inner electrical conductor and the production casing 42 acting as an outer electrical conductor.

In a normal well, brine 44 is used as a filling material between the case 42 and tube 40. The brine 44 acts as a conductor between the inner and outer electrical conductors (40, 42), whereas the desired material between the inner and outer conductors is a dielectric (an insulator). The lack of good insulation between the electrical conductors 40, 42 causes a problem in that the brine acts to short circuit, conducting all the current between tube 40 and case 42 at the top of the well borehole and preventing propagation of the current deep into the well. One solution to this problem, as shown in FIG. 13(b), is to insulate the inner 40 and/or outer 42 electrical conductor with an insulator 46, such as Teflon. This allows the production tube 40 and case 42 to act in the intended manner.

Figure 13:
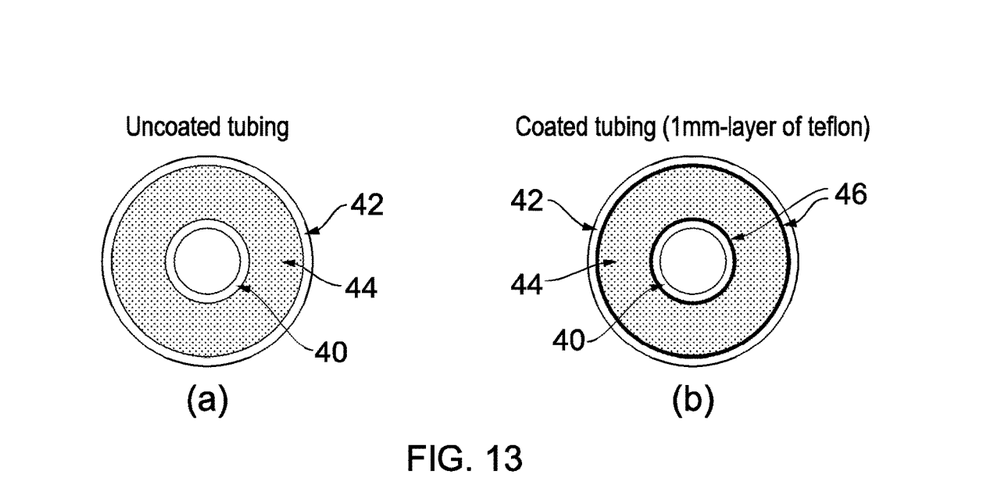
Figure 14:
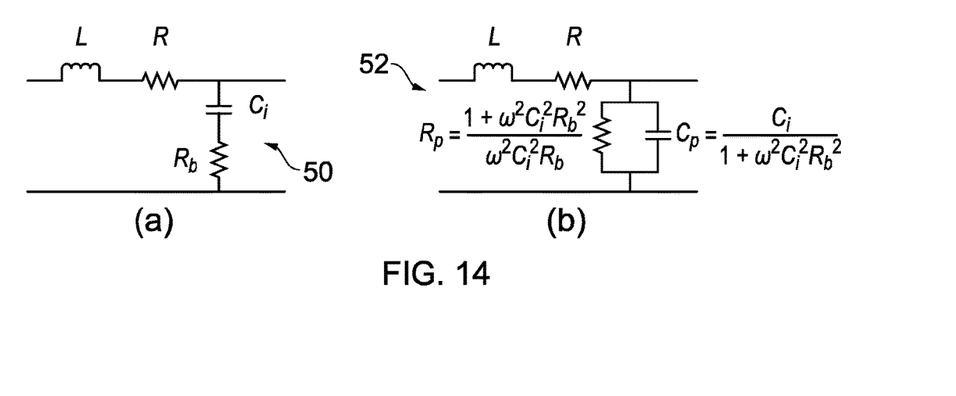

With respect to FIG. 13(b) and FIG. 14(a), the presence of brine 44 in the insulated pipe can be modelled 50 as a capacitor $C_i$ (the dielectric being the insulator 46) in series with a resistance $R_b$, the resistance set as the conductance of the brine 44. However, to model a transmission, an alternative model 52 is required in which the shunt branch has the resistance $R_b$ and the capacitance $C_i$ are in parallel. Thus, an equivalent parallel circuit can be defined as detailed in FIG. 14(b).

Figure 15:
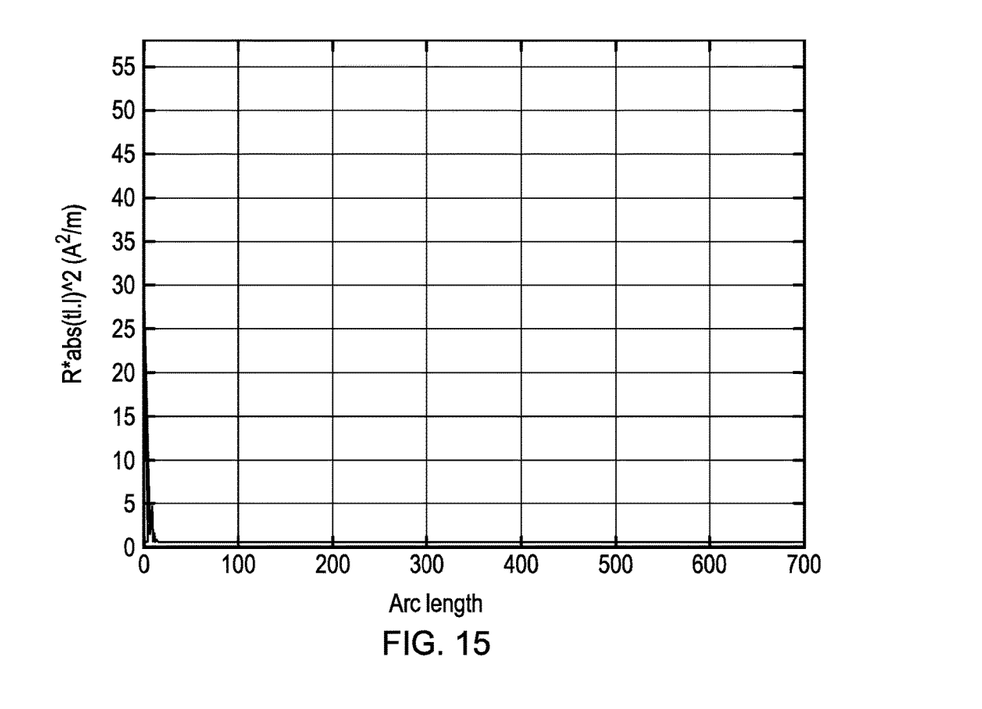
FIG. 15 is a graph representing power dissipation against length of electrical conductors with no insulation in a well borehole.
Figure 16:
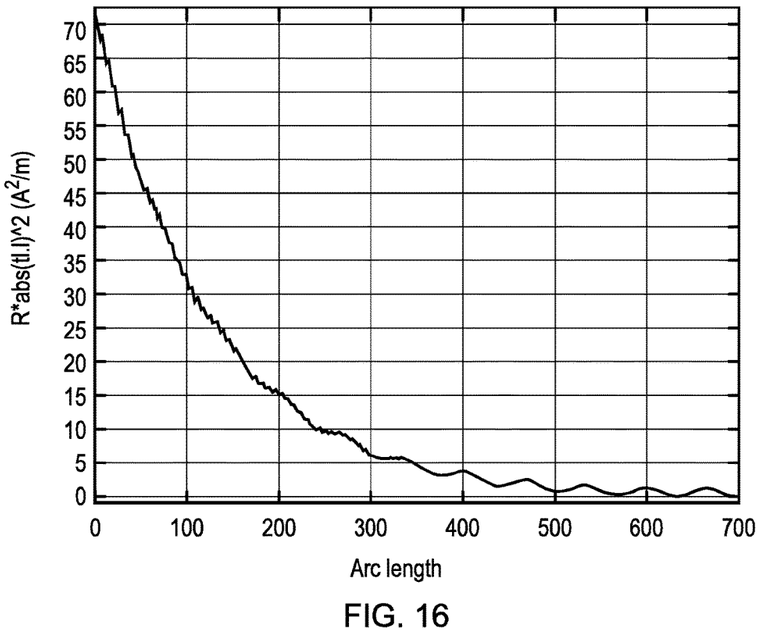
FIG. 16 is a graph representing power dissipation against length of electrical conductors with insulation in a well borehole.

The power dissipation as a function of cable length in an example scenario with input voltage set to 1 kV at 70 kHz, is shown in FIG. 15 in un-insulated form and FIG. 16 in insulated form. As can be seen, in the un-insulated case, the heating effect is constrained to the first few meters of the well, as the electrical conductors are shorted out by the brine. However, when the tubing is insulated, the current can flow in the entire cable length giving the required heating profile.

In the insulated case, power is dissipated mainly in the production tubing, rather than the casing, due to the tubing having a lower surface area (this corresponds to the usual case in a coaxial cable where the bulk of the thermal dissipation occurs in the centre conductor). This is advantageous because the heating occurs closest to the crude, or other fluid flowing in the inner tubing. An additional advantage of using the production case and tube as the coaxial element is that the heating of the crude is more even than in the case in which a cable runs down the side of the production tubing. This even heating reduces the power required to heat 1 m of the well by 1K (Well Specific Power) from 6.25 W to 4.5 W from simulations: 30% less power is required.

Replacement of Brine with Nitrogen

In existing wells, brine is used as a filler material between the production case and production tube. As discussed above, this causes a problem if the production tube and case are used as the heat trace element if the tube and case are not coated with an insulator. However, even if the case and tube are insulated, or if a dedicated heat trace cable is used, the presence of the brine causes increased thermal mass that must be heated to raise the oil above waxing temperature and, in addition, causes increased thermal conductivity between the production tube and case, causing undesirable cooling of the production tubing from the case and surrounding earth. A potential improvement, in terms of power consumption, is to replace the brine with an alternative insulating material or fluid. One preferable example is an inert gas, such as nitrogen, which is a significantly better thermal insulator than brine.

By replacing brine, or other material between the production tubing and casing, with an improved insulating material or fluid, the power required to maintain the well borehole at a temperature above the waxing temperature is decreased even further.

As mentioned above, although the embodiments above are described in relation to a well heating system, the invention can be applied to any hydrocarbon transportation and/or production system via a conductive material. For example, hydrocarbons may also require heating in a pipeline, well production tubing, well casing, flowlines, jumpers, or marine risers (from the seabed to the surface) and the invention is equally applicable to other hydrocarbon production and/or transportation systems, such as these.

Improvements and modifications may be made without departing from the scope of the invention.

The invention claimed is:

1. A hydrocarbon heating system for a hydrocarbon production and/or transportation system comprising:
    a cable comprising at least two electrical conductors separated by an insulator; and
    an alternating current (AC) power source connected to the at least two electrical conductors, wherein, the alternating current power source generates heat in the cable by providing alternating current power to the cable;

the at least two electrical conductors are terminated by an open circuit;

the at least two electrical conductors are arranged as a transmission line; and the hydrocarbon heating system is arranged to use multiple AC frequency excitations, having different combinations of AC voltage and frequency, thereby to generate a specific heating profile of the cable.

2. A hydrocarbon heating system as claimed in claim 1, wherein the at least two electrical conductors are terminated together either by an inductive connection or a capacitive connection.

3. A hydrocarbon heating system as claimed in claim 1, wherein the at least two electrical conductors are arranged as a capacitor.

4. A hydrocarbon heating system as claimed in claim 1, wherein the heating along the length of the at least two conductors is controlled by variation of: magnitude of AC voltage of the AC power source; frequency of the AC voltage of the AC power source; or a combination of AC voltage and frequency.

5. A hydrocarbon heating system as claimed in claim 1, wherein the at least two electrical conductors are attached to a tube for carrying the hydrocarbons, such that heat emanating from the at least two electrical conductors is distributed to the hydrocarbons.

6. A hydrocarbon heating system as claimed in claim 1, wherein the at least two electrical conductors are packaged in the form of a heat trace cable.

7. A hydrocarbon heating system as claimed in claim 6, wherein the heat trace cable comprises an existing electrical cable, such as a pump power cable.

8. A well comprising a hydrocarbon heating system as claimed in claim 1.

9. A marine riser comprising a hydrocarbon heating system as claimed in claim 1.

10. The hydrocarbon heating system as claimed in claim 1, wherein the hydrocarbon heating system is arranged to generate a tapered heating profile.

11. A hydrocarbon heating system as claimed in claim 1, wherein parameters of the hydrocarbon production/transportation system are collected and the AC voltage and frequency selected based on those parameters according to a pre-defined algorithm.

12. A hydrocarbon heating system as claimed in claim 11, wherein the parameters include: thermal parameters of the solids and fluids in the hydrocarbon production/transportation system; the waxing temperature(s) of the relevant hydrocarbons; the length of the hydrocarbon production/transportation system; the temperature profile of the hydrocarbon production/transportation system; and the temperature of the relevant hydrocarbons.

13. A method of heating a hydrocarbon production and/or transportation system including:

providing a cable comprising at least two electrical conductors separated by an insulator; and providing an alternating current (AC) power source connected to the at least two electrical conductors, wherein, the alternating current power source generates heat in cable by providing alternating current power to the cable;

the at least two electrical conductors are terminated by an open circuit;

the at least two electrical conductors are arranged as a transmission line; and multiple AC frequency excitations are used, having different combinations of AC voltage and frequency, thereby to generate a specific heating profile of the cable.

14. A method as claimed in claim 13, wherein the at least two electrical conductors are terminated at the end of the conductors either by an inductive connection or a capacitive connection.

15. A method as claimed in claim 13, further including controlling the heating along the length of the at least two conductors by varying: magnitude of AC voltage of the AC power source; frequency of the AC voltage of the AC power source; or a combination of AC voltage and frequency.

16. A method as claimed in claim 13, wherein the at least two electrical conductors are provided adjacent to a tube carrying the hydrocarbons, to encourage more even heat distribution.

17. The method as claimed in claim 13, wherein a tapered heating profile is generated along the length of the at least two electrical conductors.

18. A method as claimed in claim 13 further including collecting parameters of the hydrocarbon production system and selecting the AC voltage and frequency based on those parameters according to a pre-defined algorithm.

19. A method as claimed in claim 18, wherein the parameters include: thermal parameters of the solids and fluids in the hydrocarbon production/transportation system; the waxing temperature(s) of the relevant hydrocarbons; the length of the hydrocarbon production/transportation system; the temperature profile of the hydrocarbon production/transportation system; and the temperature of the relevant hydrocarbons.

* * * * *